Patented Dec. 23, 1941

2,267,099

UNITED STATES PATENT OFFICE 2,267,099

PRODUCTION OF MOLYBDENUM CARBONYL

Walter Hellriegel, Mannheim, Germany, assignor to I. G. Farbenindustrie Aktiengesellschaft, Frankfort-on-the-Main, Germany No Drawing. Application August 12, 1939, Serial No. 289,827. In Germany August 12, 1938

3 Claims. (Cl. 23—203)

The present invention relates to improvements in the manufacture of molybdenum carbonyl.

Metal carbonyls can be prepared by the action of carbon monoxide on metallic masses which have been obtained from reducible metal compounds with reducing agents such as hydrogen or carbon. In the case of nickel, cobalt, iron or ruthenium, reactive metallic initial materials are directly obtained by reduction at low temperature, whereas in the case of molybdenum which is obtained by reduction of molybdenum trioxide with hydrogen only at about 600° centigrade, it is necessary to add copper in order to produce an active initial material for the formation of carbonyl.

I have now found that molybdenum carbonyl can be obtained in a simple manner and in good yields without any need to add copper, by converting a molybdenum compound selected from the group which consists of stable divalent and trivalent molybdenum compounds which per se are not well suited as initial materials for the formation of carbonyl, into unstable molybdenum compounds of the same stage of valency and then exposing these, or substances formed therefrom by decomposition, to the action of carbon monoxide or gases containing the same, preferably under pressure and at elevated temperature.

Among stable divalent or trivalent molybdenum compounds there are to be mentioned in particular the halides and among unstable divalent or trivalent molybdenum compounds especially the oxides, hydroxides, carbonates or sulphides during or after the conversion of the stable compound into the unstable one the mass is preferably subjected to elevated temperatures, thereby a specially reactive molybdenum-containing material being obtained. Probably there are thus formed mixtures of metallic molybdenum and molybdenum compounds of a higher stage of valency, by decomposition of the conversion product, because by the treatment with carbon monoxide there is observed, in addition to the formation of molybdenum carbonyl, an enrichment of the negative constituent, as for example of the oxygen, in the residue.

For the conversion of the molybdenum halides into molybdenum-containing materials which are very suitable for the reaction with carbon monoxide to form molybdenum carbonyl, I prefer to act upon the halides with alkali metal hydroxides, carbonates or sulphides, generally in concentrated aqueous solution. There is no need to take care that the temperature does not rise. On the contrary, I prefer to perform the conversion in hot solutions, in view of the said desired decomposition.

The divalent or trivalent molybdenum halides required are preferably prepared by reacting higher molybdenum chlorides in the solid or liquid state with molybdenum metal. This is a simple manner to obtain in good yields in particular the trichloride or dichloride from the pentachloride or the dichloride from the trichloride.

For example if molybdenum powder be introduced gradually into fused pentachloride, the mass solidifies, with an increase in temperature, to an increasing extent and becomes wholly solid as soon as its composition corresponds to that of the trichloride. With an excess of molybdenum metal added from the start, there are always obtained by the careful reaction of small amounts, the red-brown trichloride, the excess of metal remaining unattacked. When working up larger amounts, the temperature readily rises so high that pentachloride vaporises, while the excess of metal further reacts with the formation of the dichloride.

An undesirably high temperature can be avoided by the addition of indifferent substances. It is advantageous to use as additional substance, already reacted reaction material and it is preferable to use a larger amount of additional substance the larger the amount of substance to be reacted.

If the trichloride, which has preferably been finely powdered, be heated with molybdenum to red heat, yellow dichloride is formed and this may be recovered from the crude mass by means of concentrated hydrochloric acid in known manner. The molybdenum pentachloride and molybdenum metal are preferably recovered directly from ores; they need not be present in the pure form.

The following examples will further illustrate how the invention may be carried out in practice but the invention is not restricted to these examples. The parts are by weight.

*Example 1*

50 parts of powdered molybdenum pentachloride, 70 parts of crude molybdenum dichloride and about 50 parts of molybdenum powder are rapidly mixed and heated in a spacious porcelain crucible to about 220° C., preferably under a protective gas, such as nitrogen. The reaction product is powdered and again heated to about 600°

C. More than 150 parts of crude molybdenum dichloride are obtained 100 parts of the said molybdenum dichloride in a purified state are heated with a concentrated solution of 90 parts of potassium hydroxide until the precipitate has become black. The precipitate is separated, washed with water and treated, without special drying, with flowing carbon monoxide at a pressure of 200 atmospheres at 200° C. By cooling, 77 parts of molybdenum carbonyl are obtained from the gas stream. There remain 28 parts of molybdenum oxide of the composition $MoO_{2.6}$.

*Example 2*

Molybdenum ore containing about 80 per cent of molybdenite, 1 per cent of copper (combined as copper sulphide) and gangue as the balance, is acted upon with chlorine at about 600° C. Molybdenum pentachloride volatilising out of the reaction chamber, is obtained. Another portion of the ore is reduced to metal powder by means of hydrogen at a temperature of from 1200° to 1300° C. 1 part of this powder is caused to react with 2 parts of the pentachloride obtained as above while heating and thus transformed into 2.5 to 3 parts of crude molybdenum dichloride.

100 parts of this molybdenum dichloride are reacted with concentrated potassium carbonate solution. The mass becomes heated, with black colouration, and then becomes solid. When brought into the form of pieces it yields 45 parts of molybdenum carbonyl by treatment with carbon monoxide at a pressure of 200 atmospheres and a temperature of 200° C.

*Example 3*

100 parts of a mixture of molybdenum dichloride and molybdenum trichloride which has been prepared by reacting 300 parts of molybdenum pentachloride with 100 parts of molybdenum powder are heated in an aqueous solution of 200 parts of crystallized sodium sulphide, while excluding the air. After separation from the liquid, the precipitate yields 20 parts of molybdenum carbonyl when being treated with carbon monoxide at a pressure of 200 atmospheres and a temperature of 200° C.

What I claim is:

1. Process of producing molybdenum carbonyl which comprises heating a halide of molybdenum selected from the class consisting of the tri- and penta-halides while in admixture with an amount of metallic molybdenum sufficient to form a composition with a halogen content less than the equivalent of the tri-halide, transforming this composition by reaction with a soluble compound selected from the class consisting of hydroxides, carbonates and sulfides without change of valence and heating the resulting composition with carbon monoxide under carbonyl forming conditions.

2. The process as defined in claim 1, wherein the molybdenum halide is molybdenum pentahalide and wherein the soluble compound is a potassium compound.

3. The process as defined in claim 1, wherein the carbonyl forming conditions involve a temperature of 200° C. and a pressure of 200 atmospheres.

WALTER HELLRIEGEL.